(12) United States Patent
Vera Sousa et al.

(10) Patent No.: US 11,983,573 B2
(45) Date of Patent: May 14, 2024

(54) MAPPING TELEMETRY DATA TO STATES FOR EFFICIENT RESOURCE ALLOCATION

(71) Applicant: EMC IP Holding Company LLC, Hopkinton, MA (US)

(72) Inventors: Eduardo Vera Sousa, Niterói (BR); Tiago Salviano Calmon, London (GB)

(73) Assignee: EMC IP Holding Company LLC, Hopkinton, MA (US)

( * ) Notice: Subject to any disclaimer, the term of this patent is extended or adjusted under 35 U.S.C. 154(b) by 378 days.

(21) Appl. No.: 17/376,249

(22) Filed: Jul. 15, 2021

(65) Prior Publication Data
US 2023/0017085 A1    Jan. 19, 2023

(51) Int. Cl.
*G06F 9/50* (2006.01)
*G06F 11/30* (2006.01)
(Continued)

(52) U.S. Cl.
CPC ............ *G06F 9/505* (2013.01); *G06F 9/5083* (2013.01); *G06F 11/3006* (2013.01);
(Continued)

(58) Field of Classification Search
CPC .... G06F 9/505; G06F 9/5083; G06F 11/3006; G06F 11/3433; G06F 18/22;
(Continued)

(56) References Cited

U.S. PATENT DOCUMENTS

| | | | |
|---|---|---|---|
| 3,069,654 A | 12/1962 | Hough, V | |
| 2007/0106405 A1* | 5/2007 | Cook | G06F 16/634 |
| | | | 707/E17.101 |

(Continued)

OTHER PUBLICATIONS

Samaneh Aminikhanghahi and Diane J. Cook. (2017). "A Survey of Methods for Time Series Change Point Detection" [Author manuscript available in PuMed Central]. School of Electrical Engineering and Computer Science, Washington State University. (https://pubmed.ncbi.nlm.nih.gov/28603327/) (35 pages).

*Primary Examiner* — Jorge A Chu Joy-Davila
(74) *Attorney, Agent, or Firm* — Chamberlain, Hrdlicka, White, Williams, & Aughtry; Aly Z. Dossa (57) ABSTRACT

Techniques described herein relate to a method for resource allocation using fingerprint representations of telemetry data. The method may include receiving, at a resource allocation device, a request to execute a workload; obtaining, by the resource allocation device, telemetry data associated with the workload; identifying, by the resource allocation device, a breakpoint based on the telemetry data; identifying, by the resource allocation device, a workload segment using the breakpoint; generating, by the resource allocation device, a fingerprint representation using the workload segment; performing, by the resource allocation device, a search in a fingerprint catalog using the fingerprint representation to identify a similar fingerprint; obtaining, by the resource allocation device, a resource allocation policy associated with the similar fingerprint; and performing, by the resource allocation device, a resource policy application action based on the resource allocation policy.

17 Claims, 4 Drawing Sheets

(51) Int. Cl.
*G06F 11/34* (2006.01)
*G06F 18/22* (2023.01)
*G06N 3/04* (2023.01)

(52) U.S. Cl.
CPC .......... *G06F 11/3433* (2013.01); *G06F 18/22* (2023.01); *G06N 3/04* (2013.01)

(58) Field of Classification Search
CPC ........ G06F 9/5011; G06N 3/04; G06N 3/092; G06N 3/0455; G06N 3/088
See application file for complete search history.

(56) References Cited

U.S. PATENT DOCUMENTS

| | | | | |
|---|---|---|---|---|
| 2011/0161391 A1* | 6/2011 | Araujo | .................. | G06Q 10/06 |
| | | | | 709/201 |
| 2013/0139174 A1* | 5/2013 | Branson | ................ | G06F 9/5083 |
| | | | | 718/104 |
| 2013/0185722 A1* | 7/2013 | Kruglick | ............... | G06F 9/5027 |
| | | | | 718/1 |
| 2018/0165579 A1* | 6/2018 | Friel | ....................... | G06N 3/044 |
| 2020/0142735 A1* | 5/2020 | Maciocco | ............... | H04L 63/20 |
| 2020/0394526 A1* | 12/2020 | Kim | .................. | G06F 18/24133 |
| 2021/0303347 A1* | 9/2021 | Sloma | .................. | G06F 11/3414 |
| 2022/0398151 A1* | 12/2022 | Nandavar | ........... | G06F 11/0781 |

\* cited by examiner

MAPPING TELEMETRY DATA TO STATES FOR EFFICIENT RESOURCE ALLOCATION

BACKGROUND

Computing devices often exist in environments that include many devices (e.g., servers, virtualization environments, storage devices, mobile devices network devices, etc.). Workloads of varying size and complexity are often deployed in such environments to be executed. However, a given workload may have different resource requirements throughput execution of the workload. For example, some workload segments may be memory intensive, other segments may require heavy processor utilization, etc. Accordingly, provisioning the maximum amount of resources required to execute a workload for the entirety of the time the workload executes may lead to periods where one or more resources are overprovisioned, which results in wasted compute resources.

SUMMARY

In general, embodiments described herein relate to a method for resource allocation using fingerprint representations of telemetry data. The method may include receiving, at a resource allocation device, a request to execute a workload; obtaining, by the resource allocation device, telemetry data associated with the workload; identifying, by the resource allocation device, a breakpoint based on the telemetry data; identifying, by the resource allocation device, a workload segment using the breakpoint; generating, by the resource allocation device, a fingerprint representation using the workload segment; performing, by the resource allocation device, a search in a fingerprint catalog using the fingerprint representation to identify a similar fingerprint; obtaining, by the resource allocation device, a resource allocation policy associated with the similar fingerprint; and performing, by the resource allocation device, a resource policy application action based on the resource allocation policy.

In general, embodiments described herein relate to a non-transitory computer readable medium that includes computer readable program code, which when executed by a computer processor enables the computer processor to perform a method for resource allocation using fingerprint representations of telemetry data. The method may include receiving, at a resource allocation device, a request to execute a workload; obtaining, by the resource allocation device, telemetry data associated with the workload; identifying, by the resource allocation device, a breakpoint based on the telemetry data; identifying, by the resource allocation device, a workload segment using the breakpoint; generating, by the resource allocation device, a fingerprint representation using the workload segment; performing, by the resource allocation device, a search in a fingerprint catalog using the fingerprint representation to identify a similar fingerprint; obtaining, by the resource allocation device, a resource allocation policy associated with the similar fingerprint; and performing, by the resource allocation device, a resource policy application action based on the resource allocation policy.

In general, embodiments described herein relate to a system for resource allocation using fingerprint representations of telemetry data. The system may include a resource allocation device, executing on a processor comprising circuitry. The resource allocation device may be configured to receive a request to execute a workload; obtain telemetry data associated with the workload; identify a breakpoint based on the telemetry data; identify a workload segment using the breakpoint; generate a fingerprint representation using the workload segment; perform a search in a fingerprint catalog using the fingerprint representation to identify a similar fingerprint; obtain a resource allocation policy associated with the similar fingerprint; and perform a resource policy application action based on the resource allocation policy.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art, that also have the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for deploying and executing workloads in a computing device infrastructure. Specifically, in one or more embodiments, when a request is received to execute a workload in a computing device infrastructure, a resource allocation device obtains telemetry data associated with the workload, and determines a set of workload segments defined by identified breakpoints in the telemetry data of the workload, where breakpoints are associated with resource requirements for the workload. In one or more embodiments, based on the breakpoints, the workload is divided into any number of workload segments. In one or more embodiments, the workload segments are then transformed into fingerprint representations, and the fingerprint representations are used as keys to search a catalog of fingerprint representations to determine if a similar fingerprint representation exists in the catalog. In one or more embodiments, if a similar fingerprint representation exists, an associated resource allocation policy is obtained, and the workload is deployed, at least in part, using the resource allocation policy. In one or more embodiments, if the catalog does not include a similar fingerprint representation, the fingerprint representation is decoded to obtain an approximation of the telemetry data for the workload segment, and used to determine a new policy for deploying the workload segment. In one or more embodiments, the new policy is then stored in the catalog along with the fingerprint representation for use in future workload deployments.

In one or more embodiments, when building an execution plan for workloads, it may be important to note that a workload may use multiple computational resources during the execution. As an example a first workload portion may be central processing unit (CPU) intensive, while the second is random access memory (RAM) intensive, a third is graphics processing unit (GPU) intensive, and a final workload portion is CPU intensive again. In one or more embodiments, in order to provide efficient resource utilization, an execution plan for such a workload should take into account the different resource requirements during different portions of the workload. One or more embodiments described herein include a framework to, given telemetry data associated with a workload, map the workload's continuous and large telemetry space to a finite space state. In one or more embodiments, having a finite space state allows different resource allocation policies to be applied the different states (i. e., portions) of a workload. In one or more embodiments, such resource allocation policy application may leverage information on states of previously executed workloads identify in order to appropriate policies.

Figure 1A:
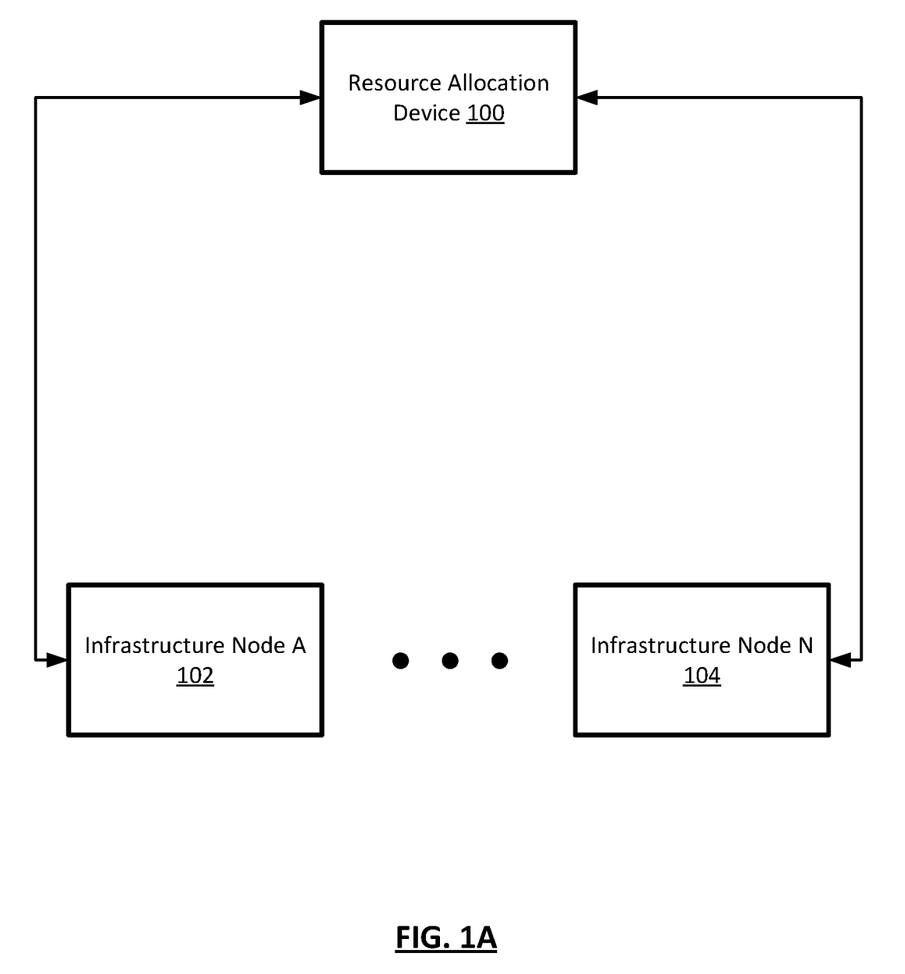
FIG. 1A shows a diagram of a system in accordance with one or more embodiments of the invention.

FIG. 1A shows a diagram of a system in accordance with one or more embodiments described herein. The system may include a resource allocation device (100) operatively connected to any number of infrastructure nodes (e.g., infrastructure node A (102), infrastructure node N (104)). Each of these components is described below.

In one or more embodiments, the infrastructure nodes (102, 104) may be computing devices. In one or more embodiments, as used herein, an infrastructure node (102, 104) is any computing device, collection of computing devices, portion of one or more computing devices, or any other logical grouping of computing resources.

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), graphics processing units (GPUs), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, an enterprise data storage array etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device or infrastructure node (102, 104). Other types of computing devices may be used as infrastructure nodes without departing from the scope of embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, an infrastructure node (102, 104) includes functionality to execute all or any portion of a workload. In one or more embodiments, a workload is any task or set of tasks to be performed by any set of computing resources, such as, for example, training for machine learning, inference, data analytics, implementing in-memory databases, classification, etc. Workloads may be uses of compute resources other than the aforementioned examples without departing from the scope of embodiments described herein.

In one or more embodiments, infrastructure nodes (102, 104) may have different configurations of computing resources. As such, in one or more embodiments, different infrastructure nodes may be more or less suitable for executing different workload portions.

In one or more embodiments, the system also includes a resource allocation device (100). In one or more embodiments, the resource allocation device (100) is operatively connected to the infrastructure nodes (102, 104). A resource allocation device (100) may be separate from and connected to any number of infrastructure nodes (102, 104). In one or more embodiments, the resource allocation device (100) is a computing device (described above). In one or more embodiments, a resource allocation device includes functionality to receive workload requests, and determine resource allocation policies to apply in order to efficiently allocate computing resources to execute the workload. As an example, a resource allocation may be a central node executing in a cloud computing environment and that receives workload execution requests, and determines resource allocation for executing a given workload using any number of infrastructure nodes (102, 104). The functionality of the resource allocation device (100) is discussed further in the descriptions of FIG. 1B and FIG. 2, below.

In one or more embodiments, the infrastructure nodes (102, 104) and the resource allocation device (100) are operatively connected via, at least in part, a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1A shows a configuration of components, other configurations may be used without departing from the scope of embodiments described herein. Accordingly, embodiments disclosed herein should not be limited to the configuration of components shown in FIG. 1A.

Figure 1B:
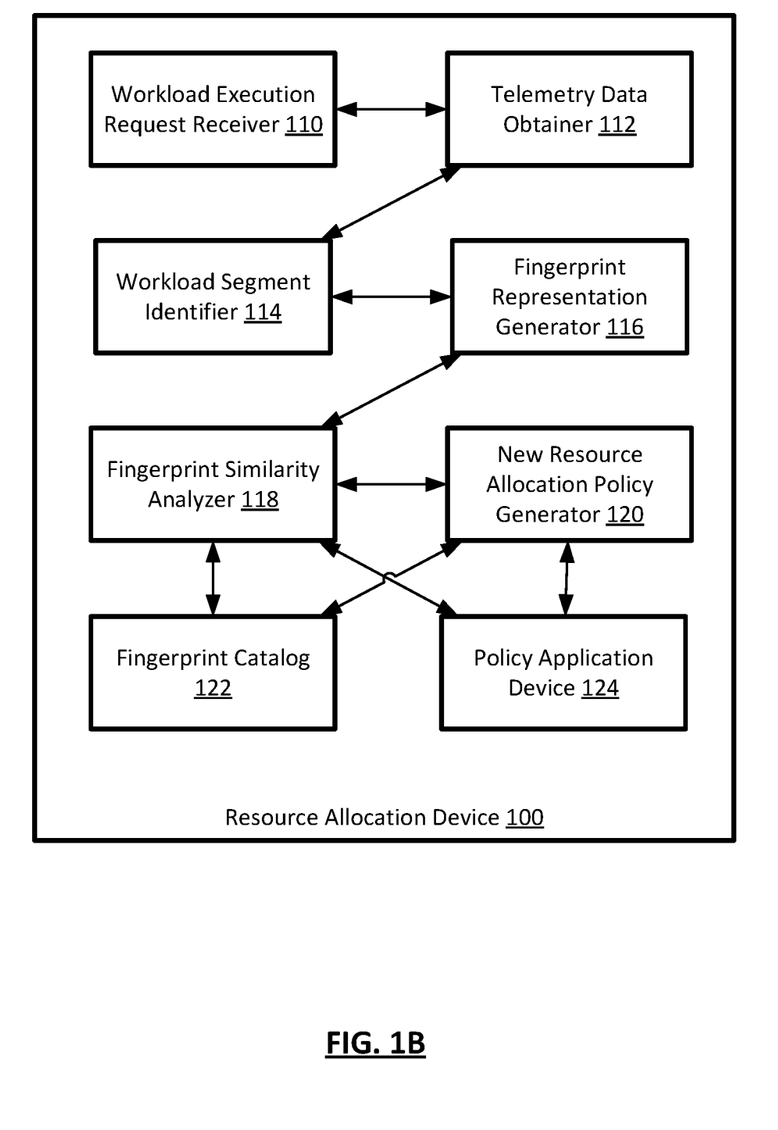
FIG. 1B shows a diagram of a resource allocation device in accordance with one or more embodiments of the invention.

FIG. 1B shows an example diagram of a resource allocation device (100) in accordance with one or more embodiments described herein. The resource allocation device (100) may include any number of components. As shown in FIG. 1B, the resource allocation device (100) includes an workload execution request receiver (110), a telemetry data obtainer (112), a workload segment identifier (114), a fingerprint representation generator (116), a fingerprint similarity analyzer (118), a new resource allocation policy generator (120), a fingerprint catalog (122), and a policy application device (124). Each of these components is described below.

In one or more embodiments, a resource allocation device (100) is all or any portion of a computing device (e.g., resource allocation device (100) of FIG. 1A), as discussed above in the description of FIG. 1A.

In one or more embodiments, the resource allocation device (100) includes a workload execution request receiver (110). In one or more embodiments, a workload execution request receiver (110) is any hardware (e.g., circuitry), software, firmware, or any combination thereof that includes functionality to obtain/receive requests to execute workloads using computing resources. In one or more embodiments, a workload is any operation, action, service, set of operations, actions, or services, etc. that may be performed by any number of computing devices or other compute resources. Examples of a workload include, but are not limited to: data analysis; graphics rendering; machine learning training, validation, execution; inference; classification; prediction; simulation, etc. Types of workloads are not limited to the foregoing list of non-limiting examples.

In one or more embodiments, workload execution requests are received in any manner capable of receiving information at computing devices (e.g., via, at least in part, one or more network interfaces of the resource allocation device (100)) or any other scheme for providing information to a computing device. As an example, a workload may be received as or transformed into a directed acyclic graph (DAG). In such an example, a workload received as a YAML Ain't Another Markup Language (YAML) file that is a manifest representing a set of interconnected services, and may be decomposed into services required, data needed, etc.

In one or more embodiments, the resource allocation device (100) includes a telemetry data obtainer (112). In one or more embodiments, the telemetry data obtainer (112) is operatively connected to the workload execution request receiver (110). In one or more embodiments, a telemetry data obtainer (112) is any hardware (e.g., circuitry), software, firmware, or any combination thereof that includes functionality to obtain telemetry data associated with a workload for which a workload execution request was received by the workload execution request receiver (110).

In one or more embodiments, such a workload has been previously executed at least once, and during said execution, telemetry data was obtained and stored. In one or more embodiments, telemetry data for a given workload is referred to as multi-channel telemetry data. In one or more embodiments, each channel represents the usage of a particular compute resource (e.g., CPU, memory, GPU, storage, network, etc.) by the workload over time (e.g., a time series).

In one or more embodiments, telemetry data may be obtained using any technique suitable for obtaining data. As an example, the telemetry data may be obtained as part of the workload execution request. As another example, the telemetry data obtainer (112) may use an identifier associated with the workload for which execution is requested to obtain the telemetry data from another computing device where such telemetry data is stored. Other techniques for obtaining telemetry data associated with a workload may be used without departing from the scope of embodiments described herein. In one or more embodiments, the telemetry data obtainer (112) stores the obtained telemetry data in storage (not shown) of the resource allocation device (100).

In one or more embodiments, the resource allocation device (100) includes a workload segment identifier (114). In one or more embodiments, the workload segment identifier (114) is operatively connected to the telemetry data obtainer (112). In one or more embodiments, the workload segment identifier (114) is any hardware (e.g., circuitry), software, firmware, or any combination thereof that includes functionality to use the telemetry data to identify breakpoints in the telemetry data that define workload segments, which are time windows in the multi-channel telemetry data between the identified breakpoints. In one or more embodiments, a breakpoint is a point at which the telemetry data indicates that one or more of the channels of the multi-channel telemetry data show a change in usage of a compute resource by the workload. As an example, CPU usage may go from high to low, memory usage may go from low to high, network bandwidth may increase significantly, etc. at certain points in time, which may be breakpoints. In one or more embodiments, the time windows between identified breakpoints may be referred to as workload segments.

Any suitable method for identifying breakpoints in multi-channel telemetry data of a workload may be used without departing from the scope of embodiments described herein. As an example, an autoencoder may be used to identify breakpoints. In one or more embodiments, an autoencoder is a type of neural network capable of compressing unlabeled data, and regenerating an approximation of the data. In one or more embodiments, the telemetry data (CPU usage, memory usage, network bandwidth, disk input/output (IO) rate, etc.), is divided into small, fixed-size time windows, which are used as training data for the autoencoder. In one or more embodiments, once the autoencoder training is completed, the encoded layer corresponds to a non-linear compression of the initial telemetry data. In one or more embodiments, by using each window as input for the autoencoder and taking the distance (e.g., Euclidean distance) between consecutive windows, a new time series is created. In one or more embodiments, the local maxima in this distance time series, when mapped back to the telemetry time series, identifies the breakpoints, which split the telemetry data into multiple workload segments.

In one or more embodiments, the resource allocation device (100) includes a fingerprint representation generator (116). In one or more embodiments, the fingerprint representation generator (116) is operatively connected to the workload segment identifier (114). In one or more embodiments, the fingerprint representation generator (116) is any hardware (e.g., circuitry), software, firmware, or any combination thereof that includes functionality to use the workload segments identified by the workload segment identifier to generate fingerprint representations of the workload segments. Any suitable technique may be used to generate a fingerprint representation of a workload segment without departing from the scope of embodiments described herein. As an example, an autoencoder may again be used, with a workload segment (i.e., a time window portion of the multi-channel telemetry data) being used as input to the autoencoder, and the compressed representation of the workload segment becoming the fingerprint representation.

In one or more embodiments, the resource allocation device (100) includes a fingerprint catalog (122). In one or more embodiments, a fingerprint catalog is a data structure that includes workload segment fingerprint representations associated with respective resource allocation policies. A fingerprint catalog may be a data structure of any type suitable for storing information items that may be associated with one another. In one or more embodiments, the fingerprint catalog is stored in storage (not shown) of the resource allocation device (100)

A resource allocation policy may be any policy that defines how to allocate resources for executing a workload segment. Examples of resource allocation policies include, but are not limited to: execute the workload segment using an infrastructure node currently using the least amount of CPU resources; increase the amount of memory allocated to the logical container executing the workload in order to execute the workload segment; move the workload to an infrastructure node with high network bandwidth capabilities to execute the workload segment; only move the workload segment to a different infrastructure node if the workload segment is longer than a defined time threshold, execute the workload segment on an otherwise unused infrastructure node, any combination of such policies, etc. Any other policy related to resource allocation for a workload segment may be a resource allocation policy without departing from the scope of embodiments described herein.

In one or more embodiments, a fingerprint catalog may be used by using a fingerprint representation of a workload segment as a key to look up an entry in the fingerprint catalog (122), thereby finding resource allocation policies associated with the fingerprint representation.

In one or more embodiments, the resource allocation device (100) includes a fingerprint similarity analyzer (118). In one or more embodiments, a fingerprint similarity analyzer (118) is operatively connected to the fingerprint representation generator (116) and the fingerprint catalog (122). In one or more embodiments, the fingerprint similarity analyzer (118) is any hardware (e.g., circuitry), software, or any combination thereof that includes functionality to use a fingerprint representation of a workload segment generated by the fingerprint representation generator (116) to search the fingerprint catalog (122) to determine if a similar fingerprint exists in the fingerprint catalog (122). Any technique suitable for determining similarity between a fingerprint representation of a workload segment and a fingerprint in the fingerprint catalog (122). As an example, a similarity function may be used that determines if a fingerprint representation as encoded by an autoencoder has a distance, calculated using a distance function (e.g., Euclidean distance, cosine similarity, etc.), from a fingerprint in the fingerprint catalog that is less than an experimentally determined threshold. In one or more embodiments, if a fingerprint representation has a distance less than the threshold, then the fingerprint representation may be considered similar to the fingerprint in the fingerprint catalog (122). In one or more embodiments, if there is no fingerprint in the fingerprint catalog (122) for which the distance relative to the fingerprint representation is less than the threshold, then the fingerprint similarity analyzer (118) may determine that there are no similar fingerprints in the fingerprint catalog (122).

In one or more embodiments, a fingerprint similarity analyzer (118) also includes functionality to determine if fingerprint representations should be grouped together to perform a similarity analysis. As an example, a certain sequence of workload segments may be known to occur sequentially in workloads. In one or more embodiments, fingerprint representations of such workload segments may be grouped together, and the group may be used to determine if a similar group exists in the fingerprint catalog (122).

In one or more embodiments, the resource allocation device (100) includes a new resource allocation policy generator (120). In one or more embodiments, the new resource allocation policy generator (120) is operatively connected to the fingerprint similarity analyzer (118) and the fingerprint catalog (122). In one or more embodiments, the new resource allocation policy generator (120) is any hardware (e.g., circuitry), software, firmware, or any combination thereof that includes functionality to receive an indication from the fingerprint similarity analyzer (118) that a fingerprint representation is not similar to a fingerprint in the fingerprint catalog (122), and to generate a new resource allocation policy for the workload segment associated with the fingerprint representation based on the indication. In one or more embodiments, the new resource allocation policy generator (120) includes functionality to use an autoencoder to decode a fingerprint representation to recover an approximation of the telemetry data represented by the encoded fingerprint representation. In one or more embodiments, the new resource policy allocation generator (120) also includes functionality to determine a new resource allocation policy based on the decoded telemetry data. Any suitable technique for determining a new resource allocation policy for a workload segment based on telemetry data without departing from the scope of embodiments described herein. As an example, a reinforcement learning scheme may be used to identify a suitable resource allocation policy to associate with execution of the workload segment. In one or more embodiments, the new resource policy allocation generator (120) also includes functionality to store the fingerprint representation and associated new resource allocation policy in the fingerprint catalog (122) for future use.

In one or more embodiments, the resource allocation device (100) includes a policy application device (124). In one or more embodiments, the policy application device (124) is operatively connected to the fingerprint similarity analyzer (118), the new resource allocation policy generator (120), and the fingerprint catalog (122). In one or more embodiments, the policy application device (124) is any hardware (e.g., circuitry), software, firmware, or any combination thereof that includes functionality to determine a resource allocation policy to apply for a workload segment. In one or more embodiments, the policy application device (124) includes functionality to receive an indication from the fingerprint similarity analyzer (118) that a similar fingerprint was identified in the fingerprint catalog (122) for a fingerprint representation, and to obtain the resource allocation policy associated with the similar fingerprint from the fingerprint catalog (122). In one or more embodiments, the policy application device (124) also includes functionality to receive an indication from the new resource allocation policy generator (120) that a fingerprint representation for which no similar fingerprint was found in the fingerprint catalog (122) has been associated with a new resource allocation policy, and to obtain said policy from the fingerprint catalog (122). In one or more embodiments, the policy application device (124) includes functionality to take a resource policy application action based on the resource allocation policy obtained. Examples of a resource policy application action include, but are not limited to, initiating deployment of a workload segment on one or more infrastructure nodes to be used in executing the workload segment, initiating actions set forth in the resource allocation policy (e.g., modifying the configuration of a virtual machine performing the workload segment), providing a report of the resource allocation policy to apply to a relevant administrator of a computing infrastructure, etc. Other actions may be taken without departing from the scope of embodiments described herein.

While FIG. 1B shows a configuration of components, other configurations may be used without departing from the scope of embodiments described herein. For example, although FIG. 1B shows all components as part of the same device, any of the components may be grouped in sets of one or more components which may exist and execute as part of any number of separate and operatively connected devices. As another example, a single component may be configured to perform all or any portion of any of the functionality performed by the components shown in FIG. 1B. Accordingly, embodiments disclosed herein should not be limited to the configuration of components shown in FIG. 1B.

Figure 2:
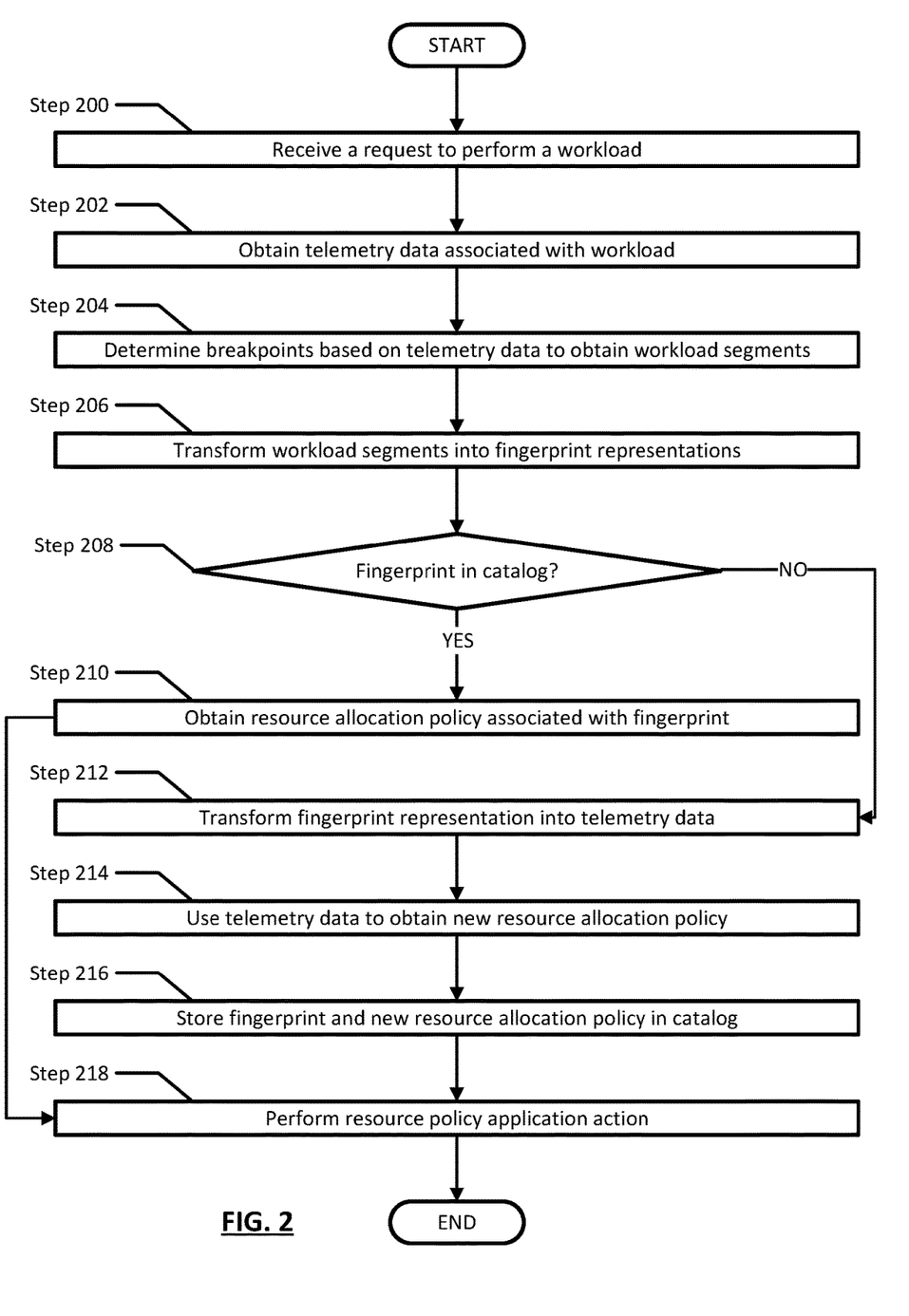
FIG. 2 shows a flowchart in accordance with one or more embodiments of the invention.

FIG. 2 shows a flowchart describing a method for resource policy identification based on fingerprint representations of workload segments in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 2.

In Step 200, a request is received to allocate resources to execute a workload. In one or more embodiments, the request is received by a resource allocation device. In one or more embodiments, a workload is any operation, action, service, set of operations, actions, or services, etc. that may be performed by any number of computing devices or other compute resources. Examples of a workload include, but are not limited to: data analysis; graphics rendering; machine learning training, validation, execution; inference; classification; prediction; simulation, etc. Types of workloads are not limited to the foregoing list of non-limiting examples.

In one or more embodiments, workload execution requests are received in any manner capable of receiving information at computing devices (e.g., via, at least in part, one or more network interfaces of the resource allocation device) or any other scheme for providing information to a computing device.

In Step 202, telemetry data associated with the workload for which an execution request was received in Step 200 is obtained. In one or more embodiments, the telemetry data associated with a workload may be obtained by a resource allocation device. In one or more embodiments, such a workload has been previously executed at least once, and during said execution, telemetry data was recorded. In one or more embodiments, telemetry data for a given workload is multi-channel telemetry data. In one or more embodiments, each channel of such telemetry data represents the usage of a particular compute resource (e.g., CPU, memory, GPU, storage, network, etc.) by the workload over time (e.g., a time series). Such telemetry data may, for example, be represented by a graph of resource usage over time for a variety of different types of compute resources.

In one or more embodiments, telemetry data may be obtained using any technique suitable for obtaining data. As an example, the telemetry data may be obtained as part of the workload execution request. As another example, an identifier associated with the workload for which execution is requested may be used to obtain the telemetry data from another computing device where such telemetry data is stored. Other techniques for obtaining telemetry data associated with a workload may be used without departing from the scope of embodiments described herein.

In Step 204, one or more breakpoints are determined using the telemetry data obtained in Step 202 in order to identify workload segments of the workload. In one or more embodiments, the workload segments are identified by a resource allocation device. In one or more embodiments, a workload segment is a time window in a workload between the beginning of a workload and a breakpoint, between two break points, or between a breakpoint and the end of a workload. In one or more embodiments, a breakpoint is a point at which the telemetry data indicates that one or more of the channels of the multi-channel telemetry data show a change in usage of a compute resource by the workload. As an example, CPU usage may go from high to low, memory usage may go from low to high, network bandwidth may increase significantly, etc. at certain points in time, which may be breakpoints. In one or more embodiments, the time windows between identified breakpoints may be referred to as workload segments.

As discussed above in the description of FIG. 1B, any suitable method for identifying breakpoints in multi-channel telemetry data of a workload may be used without departing from the scope of embodiments described herein. As an example, an autoencoder may be used to identify breakpoints. In one or more embodiments, an autoencoder is a type of neural network capable of compressing unlabeled data, and regenerating an approximation of the data. In one or more embodiments, the telemetry data (CPU usage, memory usage, network bandwidth, disk input/output (IO) rate, etc.), is divided into small, fixed-size time windows, which are used as training data for the autoencoder. In one or more embodiments, once the autoencoder training is completed, the encoded layer corresponds to a non-linear compression of the initial telemetry data. In one or more embodiments, by using each window as input for the autoencoder and taking the distance (e.g., Euclidean distance) between consecutive windows, a new time series is created. In one or more embodiments, the local maxima in this distance time series, when mapped back to the telemetry time series, identifies the breakpoints, which split the telemetry data into multiple workload segments.

In Step 206, the workload segments identified in Step 204 are transformed into fingerprint representations. Any suitable technique may be used to generate a fingerprint representation of a workload segment without departing from the scope of embodiments described herein. As an example, an autoencoder may again be used, with a workload segment (i.e., a time window portion of the multi-channel telemetry data) being used as input to the autoencoder, and the compressed representation of the workload segment becoming the fingerprint representation.

In Step 208, a determination is made as to whether a fingerprint similar to at least one fingerprint representation generated in Step 206 exists in a fingerprint catalog. In one or more embodiments, the determination is made by a resource allocation device by using the fingerprint representation of a workload segment as a key to look up a similar entry in the fingerprint catalog, thereby finding a resource allocation policy associated with the fingerprint representation. Any technique suitable for determining similarity between a fingerprint representation of a workload segment and a fingerprint in the fingerprint catalog. As an example, a similarity function may be used that determines if a fingerprint representation as encoded by an autoencoder has a distance, calculated using a distance function (e.g., Euclidean distance, cosine similarity, etc.), from a fingerprint in the fingerprint catalog that is less than an experimentally determined threshold.

In one or more embodiments, if a fingerprint representation has a distance less than the threshold, then the fingerprint representation may be considered similar to the fingerprint in the fingerprint catalog, and the method proceeds to Step 210. In one or more embodiments, if there is no fingerprint in the fingerprint catalog (122) for which the distance relative to the fingerprint representation is less than the threshold, then a determination is made that there are no similar fingerprints in the fingerprint catalog, and the method proceeds to Step 212.

In Step 210, the resource allocation policy associated with the similar fingerprint identified in Step 208 is obtained from the fingerprint catalog, and the method proceeds to Step 218.

In Step 212, based on a determination in Step 208 that no fingerprint in the fingerprint catalog was similar to the fingerprint representation being analyzed, the fingerprint representation is used to obtain an approximation of the telemetry data used to encode the fingerprint representation. In one or more embodiments, an autoencoder is used to decode the fingerprint representation to obtain the telemetry data.

In Step 214, the telemetry data obtained in Step 212 is used to obtain a new resource allocation policy. Any suitable technique for determining a new resource allocation policy for a workload segment based on telemetry data may be used without departing from the scope of embodiments described herein. As an example, a reinforcement learning scheme may be used to identify a suitable resource allocation policy to associate with execution of the workload segment.

In Step 216, the fingerprint representation is stored in the fingerprint catalog associated with the new resource allocation policy obtained in Step 214. In one or more embodiments, the fingerprint representation and associated new resource allocation policy may then be used when future fingerprint representations are analyzed and determined to be similar to the stored fingerprint representation.

In Step 218, a resource policy application action is performed based on the resource allocation policy obtained in Step 210 or Step 214. Examples of a resource policy application action include, but are not limited to, initiating deployment of a workload segment on one or more infrastructure nodes to be used in executing the workload segment, initiating actions set forth in the resource allocation policy (e.g., modifying the configuration of a virtual machine performing the workload segment), providing a report of the resource allocation policy to apply to a relevant administrator of a computing infrastructure, etc. Other actions may be taken without departing from the scope of embodiments described herein.

Example Use Case

The above describes systems and methods for generating fingerprint representations of workload segments for use in searching a fingerprint catalog to obtain a resource allocation policy for each workload segment of a workload for which execution is requested. As such, one of ordinary skill in the art will recognize that there are many variations of how such resource policy identification may be performed, as is described above. However, for the sake of brevity and simplicity, consider the following simplified scenario to illustrate the concepts described herein.

Consider a scenario in which a resource allocation device receives a request to execute a workload using infrastructure nodes operatively connected to the resource allocation device. In such a scenario, the resource allocation device obtains telemetry data associated with a previous execution of the workload.

Next, the resource allocation device performs an analysis of the telemetry data using an autoencoder neural network, with small time windows of the telemetry data used as training data, to identify distances between encoded workload portions. The distances are used to identify breakpoints in the telemetry data, which define the bounds of workload segments. One such workload segment identified is a memory intensive workload segment, and another, following the memory intensive workload segment, is a CPU intensive segment.

Next, the two aforementioned segments are used as input to an autoencoder to encode fingerprint representations of the workload segments. Next, the fingerprint representations are analyzed relative to a fingerprint catalog to determine whether the fingerprint catalog includes similar fingerprints. The similarity analysis is performed using a distance function and a threshold distance value previously determined experimentally. In this scenario, both fingerprint representations have a similar fingerprint in the fingerprint database. The fingerprint similar to the fingerprint representation for the memory intensive segment has an associated resource allocation policy that indicates that if the workload is being executed on a computing device with configurable resources, that memory should be added to the computing device for the duration of the workload segment. The workload is being executed in a logical container, so the policy is applied by adding memory to the logical container. The fingerprint similar to the fingerprint representation for the CPU intensive segment has an associated resource allocation policy that indicates that if the segment is longer than ten minutes, the workload should be transitioned to a computing device in a computing device infrastructure that is currently using the least CPU resources. The policy is applied in this case by migrating the logical container to such a computing device.

End of Example Use Case

Figure 3:
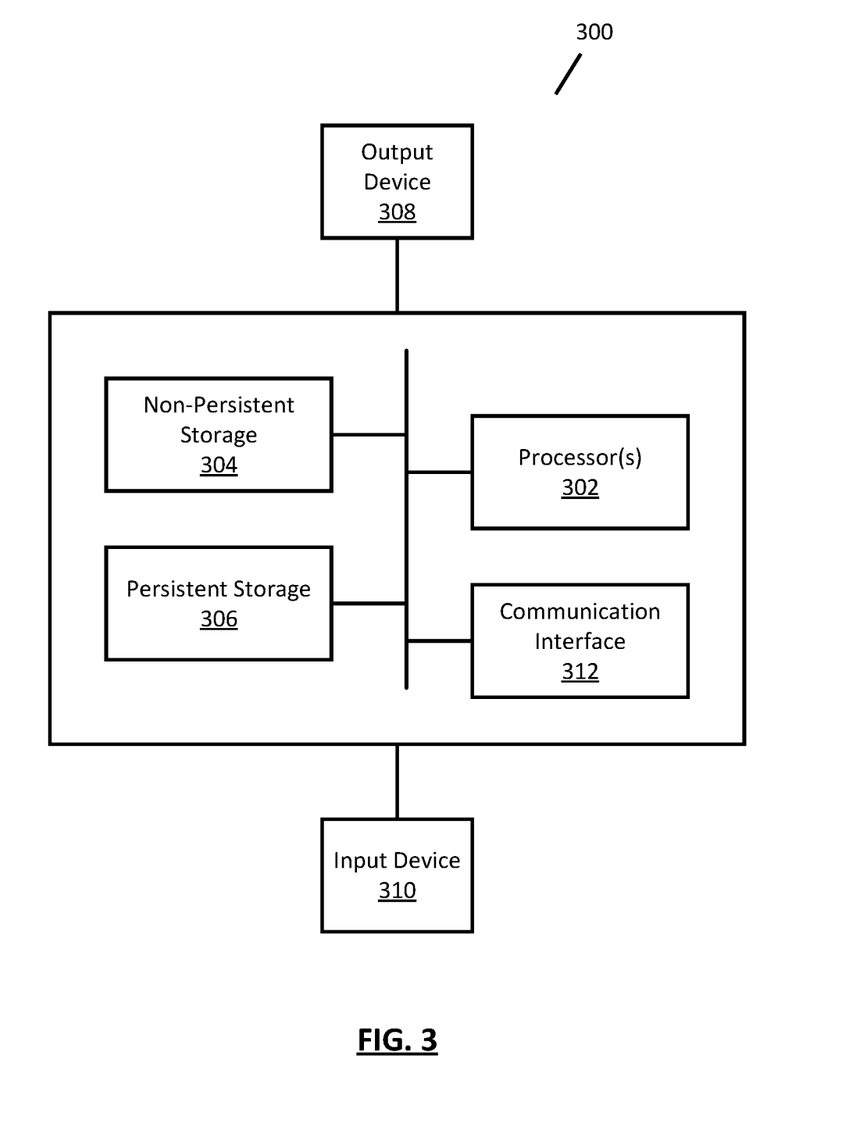
FIG. 3 shows a computing system in accordance with one or more embodiments of the invention.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for resource allocation using fingerprint representations of telemetry data, the method comprising:
   receiving, at a resource allocation device, a request to execute a workload;
   obtaining, by the resource allocation device, telemetry data associated with the workload;
   identifying, by the resource allocation device, a breakpoint based on the telemetry data;
   identifying, by the resource allocation device, a workload segment using the breakpoint;
   generating, by the resource allocation device, a fingerprint representation using the workload segment;
   performing, by the resource allocation device, a search in a fingerprint catalog using the fingerprint representation to identify a similar fingerprint;
   obtaining, by the resource allocation device, a resource allocation policy associated with the similar fingerprint;
   performing, by the resource allocation device, a resource policy application action based on the resource allocation policy;
   identifying, by the resource allocation device, a second breakpoint based on the telemetry data;
   identifying, by the resource allocation device, a second workload segment using the second breakpoint;
   generating, by the resource allocation device, a second fingerprint representation using the second workload segment;
   performing a second search in the fingerprint catalog using the second fingerprint representation to determine that no similar fingerprints are present in the fingerprint catalog;
   decoding, based on the second search, the second fingerprint representation to obtain approximated telemetry data; and
   obtaining a new resource allocation policy based on the approximated telemetry data.

2. The method of claim 1, wherein the breakpoint is identified using an autoencoder neural network.

3. The method of claim 1, wherein the fingerprint representation is generated using an autoencoder neural network.

4. The method of claim 1, wherein the breakpoint is associated with a change in usage of a compute resource by the workload.

5. The method of claim 1, wherein performing the search comprises using a distance function and a distance threshold to identify the similar fingerprint.

6. The method of claim 1, wherein the decoding is performed using an autoencoder neural network.

7. A non-transitory computer readable medium comprising computer readable program code, which when executed by a computer processor enables the computer processor to perform a method for resource allocation using fingerprint representations of telemetry data, the method comprising:
  receiving, at a resource allocation device, a request to execute a workload;
  obtaining, by the resource allocation device, telemetry data associated with the workload;
  identifying, by the resource allocation device, a breakpoint based on the telemetry data;
  identifying, by the resource allocation device, a workload segment using the breakpoint;
  generating, by the resource allocation device, a fingerprint representation using the workload segment;
  performing, by the resource allocation device, a search in a fingerprint catalog using the fingerprint representation to identify a similar fingerprint;
  obtaining, by the resource allocation device, a resource allocation policy associated with the similar fingerprint;
  performing, by the resource allocation device, a resource policy application action based on the resource allocation policy;
  identifying, by the resource allocation device, a second breakpoint based on the telemetry data;
  identifying, by the resource allocation device, a second workload segment using the second breakpoint;
  generating, by the resource allocation device, a second fingerprint representation using the second workload segment;
  performing a second search in the fingerprint catalog using the second fingerprint representation to determine that no similar fingerprints are present in the fingerprint catalog;
  decoding, based on the second search, the second fingerprint representation to obtain approximated telemetry data; and
  obtaining a new resource allocation policy based on the approximated telemetry data.

8. The non-transitory computer readable medium of claim 7, wherein the breakpoint is identified using an autoencoder neural network.

9. The non-transitory computer readable medium of claim 7, wherein the fingerprint representation is generated using an autoencoder neural network.

10. The non-transitory computer readable medium of claim 7, wherein the breakpoint is associated with a change in usage of a compute resource by the workload.

11. The non-transitory computer readable medium of claim 7, wherein performing the search comprises using a distance function and a distance threshold to identify the similar fingerprint.

12. The non-transitory computer readable medium of claim 7, wherein the decoding is performed using an autoencoder neural network.

13. A system for resource allocation using fingerprint representations of telemetry data, the system comprising:
  a resource allocation device, executing on a processor comprising circuitry, and configured to:
    receive a request to execute a workload;
    obtain telemetry data associated with the workload;
    identify a breakpoint based on the telemetry data;
    identify a workload segment using the breakpoint;
    generate a fingerprint representation using the workload segment;
    perform a search in a fingerprint catalog using the fingerprint representation to identify a similar fingerprint;
    obtain a resource allocation policy associated with the similar fingerprint;
    perform a resource policy application action based on the resource allocation policy;
    identify a second breakpoint based on the telemetry data;
    identify a second workload segment using the second breakpoint;
    generate a second fingerprint representation using the second workload segment;
    perform a second search in the fingerprint catalog using the second fingerprint representation to determine that no similar fingerprints are present in the fingerprint catalog;
    decode, based on the second search, the second fingerprint representation to obtain approximated telemetry data; and
    obtain a new resource allocation policy based on the approximated telemetry data.

14. The system of claim 13, wherein the breakpoint is identified using an autoencoder neural network.

15. The system of claim 13, wherein the fingerprint representation is generated using an autoencoder neural network.

16. The system of claim 13, wherein the breakpoint is associated with a change in usage of a compute resource by the workload.

17. The system of claim 13, wherein performing the search comprises using a distance function and a distance threshold to identify the similar fingerprint.

* * * * *